Figure 1:
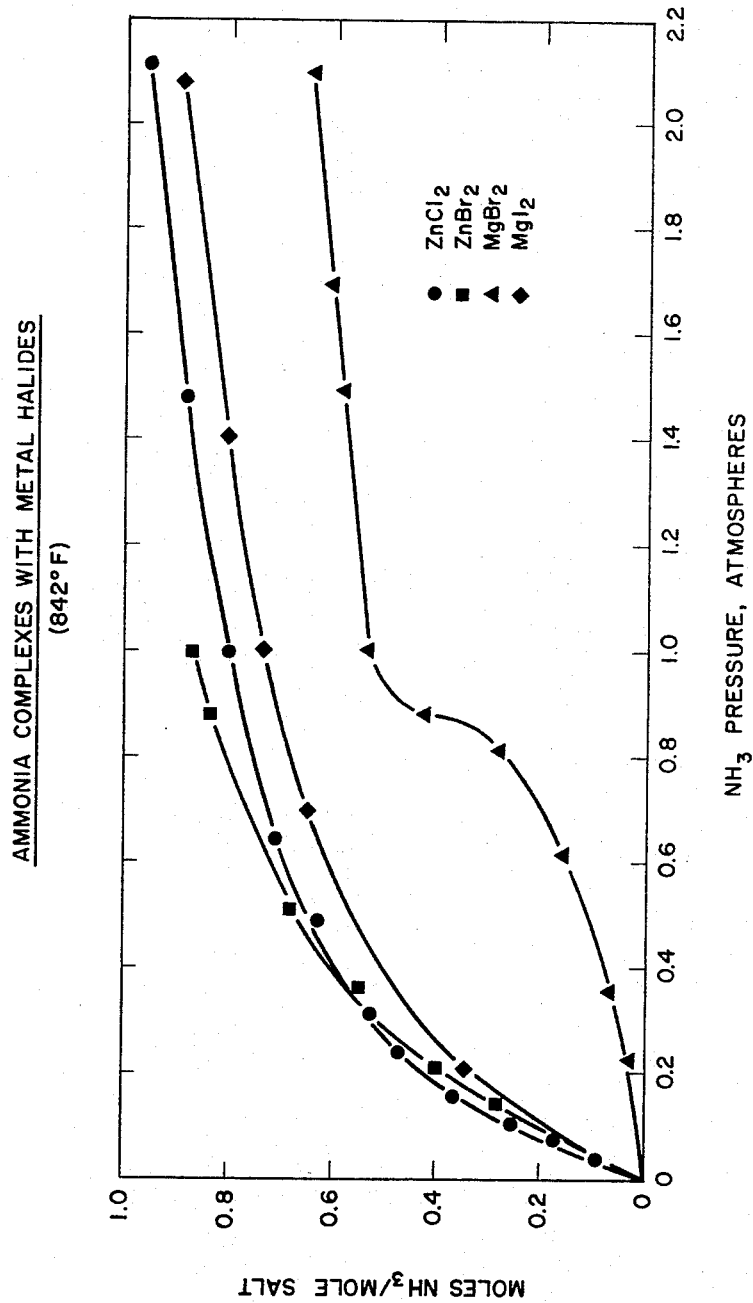

ROBERT P. CAHN Inventor

By David A. Roth

Patent Attorney

Nov. 22, 1966 R. P. CAHN 3,287,086
METAL HALIDES AS COMPLEXING AGENTS IN REVERSIBLE
CHEMICAL REACTIONS
Filed Jan. 27, 1964 2 Sheets-Sheet 2

ROBERT P. CAHN Inventor

By David A. Roth

Patent Attorney

3,287,086
METAL HALIDES AS COMPLEXING AGENTS IN REVERSIBLE CHEMICAL REACTIONS

Robert P. Cahn, Millburn, N.J., assignor to Esso Research and Engineering Company, a corporation of Delaware
Filed Jan. 27, 1964, Ser. No. 340,269
12 Claims. (Cl. 23—198)

The present invention relates to improved processes for conducting reversible chemical reactions. The present invention further relates to the use of metal halide complexing agents in reversible chemical reactions. It is generally applicable to reactions involving the fixation of nitrogen. Specifically, the present invention involves an improved process for the synthesis of ammonia by utilizing a metal halide complexing agent. The metal halide complexing agents are especially useful in shifting the reaction equilibrium in the ammonia synthesis from the reactants, e.g., nitrogen and hydrogen, to favor the formation of product ammonia.

There are many examples known to the chemical art of reversible gas phase equilibrium reactions in which the total number of molecules changes. Such reactions are known either as combination or dissociation reactions depending upon the direction studied. Examples of such reactions include the dissociation of nitrogen tetroxide, the combination of sulfur and oxygen to form sulfur trioxide, the combination of nitrogen and hydrogen to form ammonia, the dissociation of a molecule of halide to form the atomic species, the dissociation of phosphorus pentachloride to form phosphorus trichloride and chlorine, and the dissociation of ammonium chloride to form ammonia and hydrochloric acid, among many others. In such reactions, when the numbers of molecules of reactants and products are different, the position of equilibrium is effected by the total pressure although theoretically the value of $K_t$ should of course remain constant. It follows from the LeChatelier principle that increase of pressure will tend to force the equilibrium in the direction in which there is a decrease in the number of molecules and the same conclusion is reached from the law of chemical equilibrium. An example of such a system is the exothermic formation of ammonia from nitrogen and hydrogen, that is, $N_2 + 3H_2 \rightleftarrows 2NH_3$. In this example, the fraction of nitrogen converted into ammonia at low conversions is directly proportional to the total pressure. Increase of the total pressure will tend to move the position of equilibrium in the direction of a decrease in the number of molecules, that is, it should favor the formation of ammonia. Furthermore, increase of temperature will result in a decrease in the yield of ammonia, as is to be anticipated since the reaction is exothermic.

In order to produce the maximum conversion to product in this type of reaction, e.g., nitrogen and hydrogen into ammonia, it is desirable to work at as low a temperature as is compatible with an appreciable rate of reaction. Therefore, catalysts are employed in order to expedite the process. Such catalytic systems are utilized in commercial processes, for example, the "American System" and the Haber process; however, in these processes the conversion is relatively low, generally ranging below 40% and as low as 8%. Therefore, any improvement in the technique which increases the conversion will, of course, result in great material benefits. One possible method for improving the conversion in a catalytic reversible gas phase equilibrium process involves the use of a selective product sorbent in combination with (or as part of the composition of) the normal catalyst. The sorbent acts by removing the product from participation in the equilibrium reaction, i.e., by lowering the product partial pressure. This forces the equilibrium reaction in the direction of forming more product. However, once the sorbent bed becomes saturated with product, stable equilibrium conditions will be established once more.

In order to make the reaction commercially feasible, it will be necessary to remove either the spent sorbent from the reaction zone and replenish it with fresh sorbent or the product from the bed once saturation has been reached. The removal of product from the bed can be accomplished by utilizing a pressure cycle operation or such a pressure cycle with purge during the course of the reaction. One such pressure cycle with purge technique is described in U.S. Patent 2,944,627, issued July 12, 1960, entitled, "Method and Apparatus for Fractionating Gaseous Mixtures by Adsorption," issued to Charles W. Skarstrom. In such an operation, the product is sorbed almost as soon as it is formed. That is, the product is sorbed under reaction conditions of high pressure and temperature. The product then may be recovered from the bed by depressuring or, in the alternative, by increasing the temperature, or by combination of the aforementioned methods. The properties of the sorbent chosen for use in a pressure cycle operation will therefore differ from the properties desired of a sorbent under isobaric conditions. For example, under isobaric conditions, the most important property of the sorbent bed would be the total sorptivity towards the component desired to be sorbed. On the other hand, the most important property for a sorbent operating under pressure cycle conditions would be the working capacity. The working capacity being defined as the total amount of product sorbed at the high pressure level minus the total amount of material sorbed at the low pressure level. It is evident that this working capacity is equivalent to the total amount of product withdrawn from the equilibrium during each pressure cycle. Thus, it is of great importance to secure sorbents having maximum value for the working capacity.

The same reasoning holds if spent sorbent is continuously removed from the reaction zone and replaced by fresh sorbent. The amount of effort required to regenerate the sorbent external to the reaction zone, i.e., liberate the desired product, is directly dependent on the above defined working capacity. This is so whether regeneration is by a temperature change or a pressure change, or by a combination of these two variables.

It is therefore an object of the present invention to provide materials, which materials are characterized by the property of forming reversible complexes at reaction conditions with the products of reversible chemical reactions. It is another object of the present invention to provide complexing agents which are liquid at reaction conditions. It is a still further object of this invention to provide liquid complexing agents for ammonia at ammonia temperatures and conditions. Further objects will become readily apparent on examination of the following discussion.

It has now been found that the yields of product from a reversible equilibrium controlled chemical reaction can be substantially increased by utilizing a material which will reversibly and selectively complex with the desired product. In an embodiment of the present invention, a metal halide, preferably in molten form, is utilized to complex product ammonia in an ammonia synthesis reaction thereby driving the ammonia equilibrium towards completion. The ammonia is ultimately recovered by decomposing the metal halide-ammonia complex either by an increase of the temperature or by a reduction in the pressure of the system or by a combination of the two.

The complexing agent utilized in the present invention is selected for its property of having an affinity for the product of the reversible chemical reaction in question at or substantially at reaction conditions. For example, in the specific embodiment concerning the synthesis of ammonia, it is desirable to utilize certain metal halides, some of which are liquid at the synthesis conditions of temperature and pressure, since such metal halides exhibit the property of forming reversible complexes with the ammonia. Preferred examples of metal halides useable in the present invention include the halides of metals in groups II–A, II–B, VII–A and VIII of the Periodic Table. Desirable metal halides within these groups include the halides of zinc, manganese, iron, cobalt, nickel and magnesium. Specific compounds useable as complexing agents in the practice of the present invention include zinc chloride, zinc bromide, zinc iodide, manganese chloride, ferrous chloride, ferrous iodide, ferrous bromide, cobalt chloride, cobalt bromide, nickel chloride, magnesium chloride, magnesium bromide and magnesium iodide. Preferred compounds include the halides of zinc and magnesium. Very preferred compounds include zinc chloride and magnesium bromide.

The use of of metal halide complexing agents in the ammonia synthesis results in the following advantages:

(1) The synthesis pressure can be substantially reduced, since even a few percent conversion will give sufficient ammonia to allow sorption.

(2) The reaction can be made to go to completion thereby eliminating the need for a recycle gas loop and a compressor, and obviating the necessity of a stoichiometric ratio of nitrogen and hydrogen in the fresh feed gas.

(3) The impurities level in the fresh feed gas can be increased, since these impurities will not build up and interfere with the reaction in a once-through system to the same extent as in a recycle loop.

(4) The metal halide capacity for ammonia is quite high at or near synthesis reaction conditions.

(5) The formation of the complex is very rapid.

(6) Many of the metal halides form molten systems at reaction conditions which molten systems are easier to handle than corresponding solids systems.

The present invention will become more readily apparent upon examination of the accompanying figures.

Figure 2:
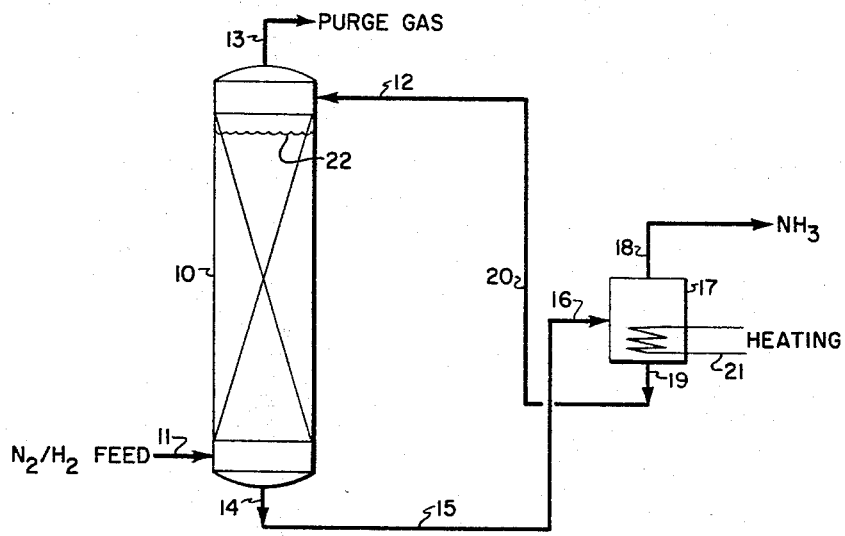
Figure 3:
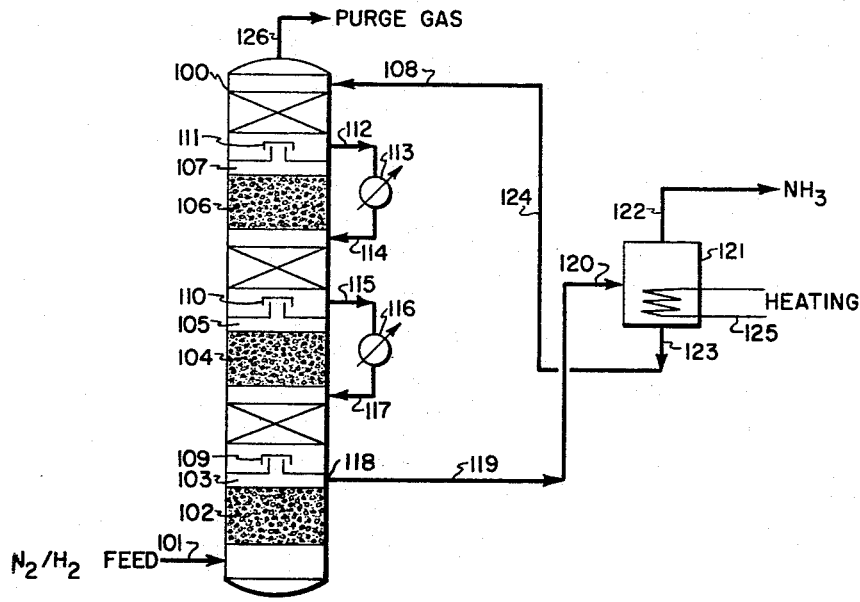

FIGURE 1 graphically represents the relationship between the capacity of zinc and magnesium halides for ammonia at different ammonia pressures;

FIGURE 2 shows a diagrammatic representation of a reactor system utilizing a straight percolation of the molten metal halide through the reactor zone and a regeneration zone; and FIGURE 3 diagrammatically describes a reactor system wherein the reactor has alternating reaction and sorption zones in conjunction with a regeneration zone.

FIGURE 1 graphically shows the capacity for ammonia of various molten metal halide salts at different ammonia pressures. The data has been derived from studies on complexes of ammonia with zinc chloride, zinc bromide, magnesium bromide and magnesium iodide. All of these metal halides are molten at the temperature utilized, e.g., 842° F.

As indicated in the graph, all of these metal halides form complexes at the temperature of the study, which complexes contain from 0.5 to 0.85 mol of ammonia per mol of salt at only 1 atmosphere ammonia pressure. In determining the comparative desirability of utilizing zinc or magnesium salts in the ammonia synthesis reaction, the following factors must be kept in mind. Generally, it is found that the zinc salts are less expensive and result in complexes having higher ammonia capacity.

On the other hand, the magnesium salts have much lower vapor pressures and are less reactive. The latter considerations are of importance when the ammonia synthesis catalyst is easily poisoned. In addition, the magnesium bromide has a higher working capacity if desorption or decomplexing is carried out at above 0.2 atmosphere of ammonia.

Other halide complexes, which have dissociation pressures between 3 atmospheres and 10 atmospheres (extrapolated from low temperature data) are useful if the total reactor pressure is raised above 40 atmospheres, or if lower temperatures than about 842° F. are used in the complexing step. These include nickel chloride, magnesium chloride, cobalt chloride, ferrous iodide, ferrous chloride, ferrous bromide, and cobalt bromide.

In the following description, two typical systems utilizing the complexing material in molten state are described. Specifically, they cover systems in which the sorbent is circulated in molten state through the reactor and through a regeneration system. However, it is to be understood that other modifications can also be used. Thus, the complexing solid can be in solid form, moving through the system either as a moving bed or in a fluidized state. Or, the solid complexing material may be dispersed in the form of a slurry in an inert, molten material. Or the complexing material, in solid form, may be interspersed with the catalyst as described in U.S. 2,944,627. Or, the complexing material can be put, in granular form, into separate fixed bed sorption vessels which can be tied into either the synthesis or regeneration loop by means of proper valving.

Turning now to FIGURE 2, a reactor system for the synthesis of ammonia utilizing straight percolation of the molten halide in the reactor zone is depicted. Reactor vessel 10 contains a packed bed of an ammonia synthesis catalyst of a type well known to the art. It is desirable that the type of catalyst used be selected from the group which are chemically resistant to metal halides. The reaction zone is maintained at a temperature in the range between 700 to 950° F., preferably in the range between 800 to 900° F. The pressure is maintained in the range between 5 to 350 atmospheres, preferably 20 to 250 atmospheres.

The reaction stream, comprising nitrogen and hydrogen gases, enters reaction zone 10 through inlet means 11. The ratio of the respective gases in the reaction stream need not be 3 to 1 $H_2/N_2$. This ratio can be 2 to 1 or even 1½ to 1. It is important that the hydrogen gas be totally used up. If this is accomplished, the process will be economical. Use of a lower than 3 to 1 $H_2/N_2$ ratio reaction stream mixture gives the process greater flexibility. The reactants source is therefore no longer limited to a steam reforming furnace or a partial oxidation reactor using oxygen or enriched air, but rather may be obtained from adiabatic catalytic or non-catalytic reactors utilizing hydrocarbon and air feeds.

The reaction stream passes upwardly through reactor vessel 10 and through the catalyst bed 22. The ammonia that is formed is immediately complexed with molten metal halide which enters through line 12 and descends through reactor vessel 10. Thus, a countercurrent type of contact is obtained between the descending molten metal halide stream and the rising reaction gas stream containing the product ammonia. In this manner, the partial pressure of ammonia in the reactor vessel 10 is maintained near the equilibrium decomposition pressure of the ammonia-metal halide complex, i.e., at a sufficiently low level so as to drive the synthesis reaction in the direction of producing more ammonia. For the purposes of the system described, it is desirable that this partial pressure of ammonia be maintained in the range between 0.3 to 10 atmospheres of ammonia, preferably in the range between 0.5 to 5 atmospheres of ammonia.

Purge gas, consisting mainly of unreacting components in the original reaction stream mixture, unadsorbed ammonia and unreacted nitrogen and hydrogen, is removed from reaction zone 10 by means of gas outlet means 13. Product ammonia in the form of a molten metal halide complex is removed from reaction zone 10 by means of product outlet means 14. The molten complex flows through line 15 and enters regeneration zone 17 through inlet 16.

In the embodiment shown, the regeneration zone utilizes a delta-T operation to decompose the molten metal halide product complex. It is desired that the regeneration zone in such a delta-T process be maintained at a temperature in the range between 700 to 1200° F., preferably in the range 900 to 1000° F. The regeneration zone is heated by heating means 21. Product ammonia obtained from the decomposed complex is removed from regeneration zone 17 by means of outlet line 18 and is collected by suitable means known to the art, e.g., by absorption in water. The recovered uncomplexed metal halide, still in the molten state, is recycled to reaction zone 10 by means of outlet 19 and line 20. Heat exchange means (not shown) can be used to conserve heat between the entering and effluent streams.

Alternatively, it is possible to utilize pressure reduction, either alone or in combination with an increase in temperature, in regeneration zone 17 to effect decomposition of the complex. In such an embodiment, zone 17 would be equipped with the necessary pipes and valving known to the art to effect depressuring. It would be desirable to utilize a pressure in the range between 0.1 and 5 atmospheres of ammonia, preferably in the range between 0.2 and 2 atmospheres of ammonia to effect the decomposition of the complex in zone 17. The decomposition of the complex by means of a pressure reduction may cause extensive cooling in zone 17. Therefore, heating means 21 may be utilized to maintain the temperature in zone 17 at the desired level in the range previously indicated for the delta-T embodiment.

In an especially preferred embodiment of FIGURE 2, zinc chloride is utilized as the metal halide. In this embodiment it is desired that zone 10 be maintained at a pressure in the range between 10 and 300 atmospheres and at a temperature in the range between 700 and 1000° F. Regeneration zone 17 should be maintained at a temperature in the range between 800 and 1200° F. for a delta-T type operation or a pressure in the range between 0.1 and 5 atmospheres for delta-P operation, although a combination of temperature and pressure changes will probably be preferred.

Referring now to FIGURE 3, a reaction system utilizing an alternating reaction and adsorption zone reaction vessel is depicted. In this embodiment the feed stream, e.g. a mixture of nitrogen and hydrogen gases, enters reactor vessel 100 through inlet line 101. Reactor vessel 100 is divided into a plurality of zones. Zones 102, 104, and 106 contain catalyst beds which are selective for the synthesis of ammonia from nitrogen and hydrogen. A desirable catalyst for this purpose consists of promoted iron granules. These beds are maintained at a pressure in the range between 10 to 500 atmospheres, preferably 20 to 250 atmospheres, and a temperature in the range between 750 to 950° F., preferably 800 to 900° F. Sorption zones 103, 105 and 107 are placed in alternating fashion between the catalyst zones. The respective sorption zones utilize a molten metal halide which enters reactor vessel 100 through inlet means 108.

The system functions as follows. The reaction gas stream initially contacts the catalyst bed in zone 102. This zone is maintained at ammonia synthesis conditions of temperature and pressure. Some of the nitrogen and hydrogen are accordingly converted into ammonia. The gas stream rising out of zone 102 comprises a mixture of nitrogen, hydrogen and ammonia and is then passed into sorption zone 103 through vapor-liquid partition means 109. Sorption zone 103 contains distributing means such as packing or plates over which molten metal halide flows downward through the zone in a countercurrent fashion to the rising gas mixture stream. The sorption zone is maintained at a pressure between about 10 to 500 atmospheres, preferably 20 to 250 atmospheres, and a temperature in the range between 500 to 900° F., preferably between 600 to 850° F. The product ammonia contained in the gas mixture complexes with the metal halide and is substantially removed from the gas mixture.

The remaining gas stream, now consisting mainly of the reacting hydrogen and nitrogen gases, moves upward through a vapor-solid partition into catalyst zone 104 which zone is maintained at the reaction conditions noted for zone 102. Since the partial pressure of ammonia has been substantially reduced due to the passage through sorption zone 103, the reaction once again is pushed forward in the direction of producing more product ammonia.

The resulting gas stream from zone 104 once again contains a substantial concentration of product ammonia. This gas stream then enters sorption zone 105 through vapor-liquid partition means 110 where the sorption process is repeated. The reaction gas stream undergoes the cycle once more through catalyst zone 106 and sorbent zone 107 (entrance into zone 107 being obtained through vapor-liquid partition means 111).

The embodiment as depicted in FIGURE 3 utilizes a total of six alternating reaction and sorption zones. It is possible to use a greater or fewer number of zones than herein depicted. It is desirable that there be sufficient number of zones to effect the conversion of substantially all the hydrogen gas present in the original reaction stream mixture to ammonia.

The molten metal halide enters reactor vessel 100 through inlet means 108. In the specific embodiment wherein the molten metal halide comprises zinc chloride, the temperature of the molten salt is within the range between 500 to 800° F., preferably in the range between 550 to 700° F. After the zinc chloride has contacted the reaction gases from catalyst zone 106 in sorption zone 107 in countercurrent fashion, the zinc chloride-ammonia complex obtained as a liquid is removed by means of outlet 112, which outlet communicates with intercooler system 113 which intercooler comprises a heat exchange system of a type known to the art. The zinc chloride-ammonia complex is cooled from its original temperature of about 600 to 800° F. to a temperature of about 500 to 700° F. The cooled zinc chloride and zinc chloride-ammonia complex mixture is then returned to the top of sorption zone 105 where the sorption process is repeated. The zinc chloride-zinc chloride ammonia complex, now containing a larger concentration of the complex stream, then passes to intercooler 116 by means of outlet 115. The molten salt mixture is again cooled from about 600 to 800° F. down to 500 to 700° F. The cooled molten salt flows into sorption zone 103 by means of inlet 117. The sorption process is again repeated and the molten salt mixture containing a substantial portion of molten salt-ammonia complex is removed from the process by means of outlet 118 and line 119. The repeated cooling is necessary as the synthesis reaction is exothermic and therefore cooling favors the formation of product.

Line 119 carries the molten salt-molten salt ammonia complex material to regeneration zone 121 by means of inlet 120. This regeneration zone operates in the same fashion as previously described for FIGURE 2 above. Outlet lines 122 and 123 carry product ammonia and decomposed molten salt, respectively. Line 124 carries decomposed molten salt from outlet line 123 to inlet means 108 where it is returned to the reaction vessel. Heating means 125 is utilized in the same manner in the regeneration zone as described previously for the FIGURE 2 embodiment. Purge gas consisting mainly of unreacted components in the original gas mixture and small amounts of hydrogen, nitrogen and ammonia is eliminated from reactor vessel 100 by means of gas outlet line 126.

The embodiment of FIGURE 3 is utilized especially in the case when the catalyst in question is susceptible to poisoning by molten metal halides. For example, such a case would arise when promoted iron granules are utilized as the catalyst and zinc chloride is utilized as the molten sorbent.

While specific embodiments of the present invention have been described in some detail, such embodiments should not be taken as limiting the scope of the present invention in any way. It should be emphasized that the invention can be practiced other than in the manner without departing from the spirit of the present invention.

What is claimed is:

1. An improved process for the synthesis of ammonia from nitrogen and hydrogen gas comprising the following steps in combination:
    (A) contacting a gas stream comprising nitrogen and hydrogen with an ammonia synthesis catalyst at ammonia synthesis conditions of temperature and pressure whereby product ammonia is formed;
    (B) complexing said product ammonia with reversible ammonia complex forming metal halide at said synthesis conditions whereby the partial pressure of said ammonia is substantially reduced and the said synthesis is driven in the direction of forming more product ammonia.

2. The process of claim 1 wherein said metal halide-ammonia complex is decomposed to yield said product ammonia and said metal halide, said product ammonia being collected while said metal halide is recycled to complex more ammonia.

3. The process of claim 2 wherein said metal halide is selected from the group consisting of the halides of zinc, manganese, iron, cobalt, nickel and magnesium.

4. The process of claim 3 wherein said metal halide is in the molten state.

5. The process of claim 4 wherein said molten metal halide is zinc chloride.

6. The process of claim 4 wherein said molten metal halide is zinc bromide.

7. The process of claim 4 wherein said molten metal halide is magnesium bromide.

8. The process of claim 4 wherein said molten metal halide is magnesium iodide.

9. An improved process for the synthesis of ammonia from nitrogen and hydrogen gas comprising the following steps in combination:
    (A) flowing a gas stream comprising nitrogen and hydrogen upwardly through a reaction zone at ammonia synthesis conditions of temperature and pressure, said reaction zone containing a bed of ammonia synthesis catalyst which catalyst is relatively chemically inert to a reversible ammonia complex forming molten metal halide at said synthesis conditions, wherein said gas stream contacts said catalyst bed thereby forming product ammonia;
    (B) flowing a stream of a reversible ammonia complex forming molten metal halide downwardly through said reaction zone so that said rising gas stream and said descending molten metal halide stream are in intimate countercurrent contact with each other, whereby said product ammonia is removed from said gas stream as a molten metal halide-ammonia complex thereby substantially reducing the ammonia partial pressure in said gas stream thus driving the synthesis reaction in the direction of forming more product ammonia.

10. The process of claim 9 wherein said molten metal is selected from the group consisting of the halide of zinc, manganese, iron, cobalt, nickel and magnesium.

11. The process of claim 10 wherein said molten metal halide-ammonia complex is removed from said reaction zone and decomposed to yield said product ammonia and said molten metal halide, said product ammonia being collected while said molten metal halide is recycled to said reaction zone to complex more ammonia.

12. An improved process for the synthesis of ammonia from nitrogen and hydrogen gas comprising the following steps in combination:
    (A) flowing a gas stream comprising nitrogen and hydrogen upwardly through a reaction zone at ammonia synthesis conditions of temperature and pressure, said reaction zone containing a bed of ammonia synthesis catalyst, wherein said gas stream contacts said catalyst bed thereby forming product ammonia;
    (B) flowing said resulting gas stream comprising nitrogen, hydrogen and product ammonia upwardly through a sorption zone wherein said rising resulting gas stream contacts a downwardly flowing reversible ammonia complex forming molten metal halide stream in intimate countercurrent fashion, whereby said product ammonia is removed from said gas stream as a molten metal halide-ammonia complex thereby substantially reducing the partial pressure of ammonia in said resulting gas stream;
    (C) repeating steps A and B for a plurality of cycles wherein the said resulting gas stream from step B of each cycle becomes the gas stream utilized in step A of the next cycle; said cycles being repeated until said resulting gas stream is essentially depleted of hydrogen;
    (D) recovering said molten metal halide-ammonia complex from the first reaction zone;
    (E) decomposing said molten metal halide-ammonia complex, collecting product ammonia and recycling said recovered molten metal halide to said downwardly flowing stream of step B.

No references cited.

OSCAR R. VERTIZ, *Primary Examiner.*

J. J. BROWN, *Assistant Examiner.*